US005777742A

United States Patent [19]
Marron

[11] Patent Number: 5,777,742
[45] Date of Patent: Jul. 7, 1998

[54] SYSTEM AND METHOD FOR HOLOGRAPHIC IMAGING WITH DISCERNIBLE IMAGE OF AN OBJECT

[75] Inventor: Joseph C. Marron, Brighton, Mich.

[73] Assignee: Environmental Research Institute of Michigan, Ann Arbor, Mich.

[21] Appl. No.: 282,781

[22] Filed: Feb. 4, 1994

Related U.S. Application Data

[63] Continuation-in-part of Ser. No. 29,627, Mar. 11, 1993, abandoned.

[51] Int. Cl.⁶ .................................................. G01B 9/02
[52] U.S. Cl. ........................................ 356/359; 356/360
[58] Field of Search ............................. 356/359, 360, 356/361, 345, 346; 359/32

[56] References Cited

U.S. PATENT DOCUMENTS

| 4,957,367 | 9/1990 | Ducman | 356/359 |
| 5,384,573 | 1/1995 | Turpin | 359/32 |
| 5,398,113 | 3/1995 | de Groot | 356/360 |

OTHER PUBLICATIONS

"Wavelength decorrelation of laser speckle from three-dimensional diffuse objects", by Joseph C. Marron, 1992 Elsevier Science Publishers B.V., Optics Communication.

"Three-dimensional, fine-resolution imaging using laser frequency diversity", Joseph C. Marron and Timothy J. Schultz, 1992 Optical Society of America, Optics Letters.

"Three-dimensional lensless imaging user laser frequency diversity", Joseph C. Marron and Kirk S. Schroeder, 1992 vol. 31, No. 2, Applied Optics.

*Primary Examiner*—Samuel A. Turner
*Attorney, Agent, or Firm*—Brooks & Kushman P.C.

[57] ABSTRACT

A system and method for three-dimensional imaging utilize a lens to perform a two-dimensional Fourier transform of an interference pattern while focusing the pattern on a two-dimensional detector array which is positioned in the image plane of the lens. This allows immediate previewing of the imaged object for proper positioning. Coherent energy beams are utilized to create a series of interference patterns, or image-plane holograms, each at a different frequency of the source energy beams. Furthermore, at each frequency, the relative phase between an object and a reference energy beam is varied to capture the complex values associated with the interference patterns. After capturing and storing the various interference patterns, a computer performs a one-dimensional Fourier transform, or other simplified processing to generate the three-dimensional image of the object. The image resolution extends to the micron range making this system and method easily adaptable to a variety of three-dimensional inspection applications.

27 Claims, 4 Drawing Sheets

SYSTEM AND METHOD FOR HOLOGRAPHIC IMAGING WITH DISCERNIBLE IMAGE OF AN OBJECT

CROSS-REFERENCE TO RELATED APPLICATION

This application is a continuation-in-part of U.S. Ser. No. 08/029,627 filed Mar. 11, 1993, titled "METHOD AND APPARATUS FOR THREE-DIMENSIONAL INSPECTION", now abandoned.

TECHNICAL FIELD

The present invention relates to a system and method for three-dimensional imaging utilizing a broad-band, coherent energy source with varying frequency and phase.

BACKGROUND ART

Holography is a well established methodology for producing a three-dimensional image of an object. Traditionally, however, it has been difficult to capture and utilize the information present in a holographic interference pattern. Typically, the generated interference pattern is recorded in a photographic emulsion or by a two-dimensional detector array. The photographic emulsion media is not amenable to computer processing. A conventional two-dimensional detector captures the intensity of the interference pattern and transduces the interference pattern into electrical signals which are, of course, more easily operated on by a computer.

A recently developed technique combines in-phase and quadrature detection with a conventional two-dimensional detector array to capture the complex amplitude and phase information of the interference pattern. The technique includes computing a three-dimensional Fourier transform of a stored array representative of a plurality of holograms recorded at different source frequencies and phases. This computation is complex and may require considerable processing time on a typical mini-computer.

Since an object being imaged is not readily discernible from its interference pattern, a recognizable three-dimensional image of the object is not immediately available with this technique. Rather, a three-dimensional image is generated only after recording and processing the plurality of holograms. Thus, positioning and previewing the object to be imaged can be cumbersome and time consuming.

SUMMARY OF THE INVENTION

It is, therefore, an object of the present invention to provide a system for three-dimensional imaging which utilizes a lens to perform a two-dimensional Fourier transform thereby reducing the computational requirements of generating a three-dimensional image.

It is an additional object of the present invention to provide a system for three-dimensional imaging which records data in the image plane so as to allow immediate previewing and positioning of the imaged object.

In carrying out the above object and other objects and features of the present invention, a method is provided for forming a three-dimensional image of an object including the steps of transforming an interference pattern with a lens and detecting a discernible image for previewing and positioning the object.

The present invention provides a method and apparatus for forming a three-dimensional image of an object. The invention utilizes a lens to perform a two-dimensional Fourier transform of an interference pattern while focusing the pattern on a two-dimensional detector array which is positioned in the image plane of the lens. This allows immediate previewing of the imaged object for proper positioning while reducing the computational requirements of previous systems.

A series of image-plane holograms are projected onto the detector array, each hologram being at a different source frequency. In-phase and quadrature detection techniques are utilized to capture the complex values associated with the interference patterns. After capturing and storing the various interference patterns, a computer performs a one-dimensional Fourier transform to generate a three-dimensional image of the object.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
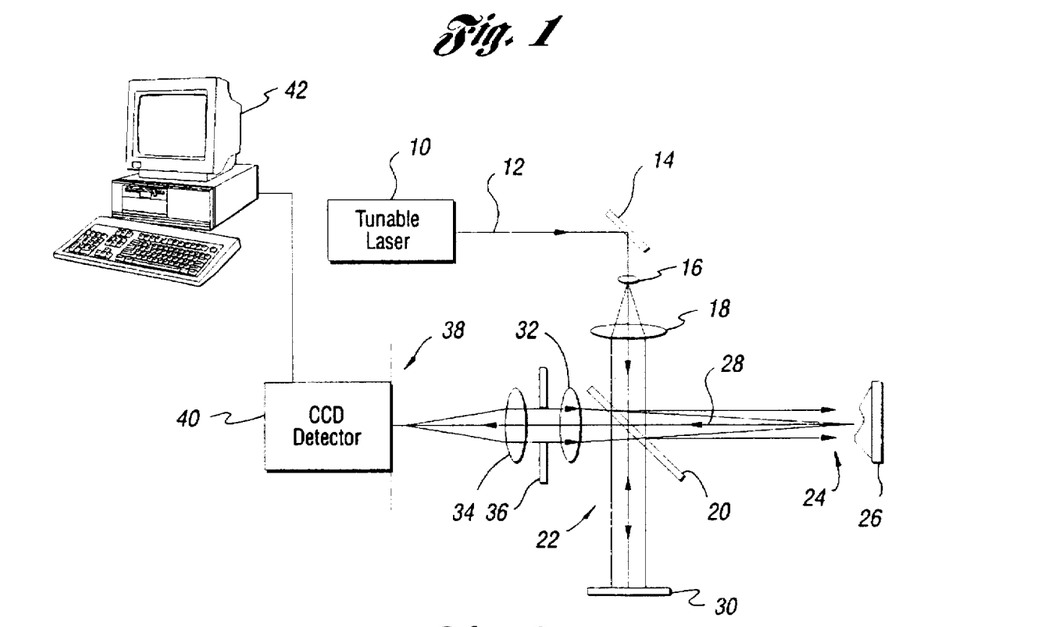
FIG. 1 is a schematic representation of a preferred embodiment of a three-dimensional optical imaging system for reflection imaging according to the present invention.

Referring now to FIG. 1, a schematic representation of a preferred embodiment of a three-dimensional optical imaging system for reflection imaging is shown. In this embodiment, a tunable laser 10, such as a dye laser, Alexandrite laser, or semiconductor diode laser, provides an optical energy beam 12 which is spatially and temporally coherent. Of course any of a number of known broadband coherent energy sources could be used including acoustic energy sources. Energy beam 12 is redirected by reflective mirror 14 before propagating through beam expander 16. It is desirable, of course, for reflective mirrors such as mirror 14 to have a reflectivity near 100% so as to minimize system losses. However, a lower reflectivity would have a similar result, as is known Beam expander 16 radially expands the beam before the beam propagates through collimating lens 18. The beam emerges from collimating lens 18 having a substantially planar wavefront. The collimated beam then propagates to a partially-reflective beam splitter 20 where it is divided into an object beam 22 and a reference beam 24. Preferably, energy beam 12 is divided so as to balance the reflected energy from object 26 incident on beam splitter 20 with the energy of reference beam 24.

With continuing reference to FIG. 1, object beam 24 impinges upon and interacts with object 26 which scatters the energy thereby forming scattered energy rays, indicated generally by reference numeral 28. A portion of the scattered energy rays propagates back toward beam splitter 20 where it combine with the phase-shifted reference beam as described below.

Reference beam 22 propagates to reflective phase shifting mirror 30 which may impart a phase shift to reference beam 22 while changing its direction of propagation back toward beam splitter 20. The phase shifter may be any of a number of known devices, such as an electro-optic, piezo-electric, or acousto-optic device or even an appropriately chosen waveplate. The phase-shifted reference beam impinges upon beam splitter 20 where it combines with reflected energy rays 28 to form an interference pattern. Lenses 32 and 34 form a telecentric imaging system. A circular aperture 36 is disposed between lenses 32 and 34 to expand the spatial bandwidth of the system while imposing an "aperture function". on the transmitted light, as is well known in the art. The telecentric imaging system allows aperture 36 to be stopped down without adversely affecting the intensity of the reference beam since lens 32 essentially focuses the reference beam to a point source located in the plane of aperture 36.

Still referring to FIG. 1, the interference pattern formed at beam splitter 20 propagates through the telecentric imaging system. Lens 34 performs a two-dimensional Fourier transform while focusing the interference pattern at image plane 38. Thus, a discernible image in the likeness of object 26 is formed in image plane 38. A two-dimensional detector array 40 is positioned adjacent image plane 38 for detecting the discernible image. The detector array may be any of a variety of detectors known in the art, such as a chargecoupled-device (CCD) array. Detector array 40 is connected to a computer 42 for storing and processing data representative of the focused interference pattern. Generally, the detector array responds to the intensity of the incident energy and produces electrical signals which are easily processed by computer 42.

As is also well known in the art, for an interference pattern to be formed, the optical path distance of the object and reference energy beams must match to within the coherence length of the energy source. Since the technique utilized in the present invention involves generating holograms over a relatively wide frequency range, it is also important to match the dispersive elements encountered by the reference and object energy beams. For example, if the reference beam travels through more glass than the object beam, the dispersion of the glass can impart an apparent shift in the object thus aberrating the image. Phase shifter 30 may be used to compensate for a mismatch or the final image may be digitally corrected to remove the aberration.

In operation, tunable laser 10 is allowed to stabilize and is tuned to the first operating frequency. An interference pattern is focused on detector array 40 as explained above, and recorded by computer 42. Phase shifting mirror 30 is used to change the phase of the object beam relative to the reference beam. Preferably, the phase is shifted by $\pi/2$. The new interference pattern is then recorded by computer 42 in a similar fashion. Conventional in-phase and quadrature detection used in the present invention repeats the above procedure changing the phase by $\pi/2$ for each repetition with a total of four repetitions at each frequency. However, it is possible to obtain images with fewer phase variations depending upon the physical characteristics of the object being imaged.

After recording the interference patterns produced by each of the phase variations, tunable laser 10 is tuned to a second frequency and the above process is repeated. Preferably, a number of equally spaced laser frequencies are utilized to produce a three-dimensional image. For example, sixty-four equally spaced frequencies may be used to produce a single three-dimensional image.

For many opaque objects, however, which have high reflectivity at only one point along the range axis of each pixel in detector array 40, a smaller number of laser frequencies are required. For such objects the range can be determined directly by a procedure referred to as phase processing which does not require Fourier processing by computer 42 as detailed below. Instead, a series of equations can be used to determine the range with each equation applying to a different source frequency of tunable laser 10. The phase is given by:

$$\phi = \text{mod}_{2\pi}\left(\frac{4\pi v D}{c}\right)$$

where $\text{mod}_{2\pi}$ is the mathematical modulus operation, $v$ is the source frequency, D is the range value to the object in the particular pixel, and c is the speed of light. The resulting series of equations can be solved in a least squares sense with an algorithm that compensates for phase wrapping effects.

Furthermore, if the frequency separation between two laser frequencies is small enough to avoid aliasing, or phase wrapping, it follows that the range can be solved for directly via:

$$\Delta\phi = \frac{4\pi \Delta v D}{c}$$

where $\Delta\phi$ is the difference between the phase values and $\Delta v$ is the frequency separation of the laser frequencies.

For each pixel in detector array 40, the complex values detected are recorded and arranged in a one-dimensional array by computer 42. A one-dimensional Fourier transformation of these one-dimensional arrays gives the complex reflectivity of the object as a function of range. Thus, by assembling these one-dimensional range profiles for each pixel in detector array 40, a three-dimensional image of object 26 is formed. The three-dimensional image is in digital form and can be easily manipulated by computer 46 for analysis and viewing. The digital image created by this system has a number of useful applications. For example, the image can easily be utilized in CAD/CAM applications or for computer vision applications, such as object recognition and optical inspection.

For example, the three-dimensional images are stored in conjunction with a coordinate system to facilitate precise dimensioning of the object as well as measurements relative to a reference position, such as the origin. The computer may calculate distances, tolerances, and other dimensional parameters pertinent to an inspection process based on the digital image. The image may also be compared to previously stored images for object recognition applications.

The resolution of the imaging system of the present invention depends upon a number of factors including the frequency separation between recordings, the width of the frequency band over which the laser is tuned, the size of the apertures used, and the focal length of the lenses. The range resolution is given by:

$$\Delta R = \frac{c}{2\Delta v}$$

where c is the speed of light and $\Delta v$ is the total bandwidth over which the laser is tuned. The angular resolution of the system is given by:

$$\Delta \alpha = 2\lambda F\# = 2\lambda \frac{f}{D}$$

where $\lambda$ is the nominal wavelength, F# is the "f/number" of the imaging system, f is the focal length of collecting lens 32, and D is the diameter of aperture 36. Also for an unambiguous image without aliasing effects, the unambiguous range must exceed the range depth of the object being imaged. The unambiguous range is given by:

$$\Delta R_{unamb} = \frac{c}{2\Delta v_{inc}}$$

where, as before, c is the speed of light and $\Delta v_{inc}$ is the frequency increment or separation.

The optical imaging system of the present invention is calibrated by imaging an object 26 which is flat. The three-dimensional image produced should, likewise be flat. The optical elements of the system are incrementally repositioned until the desired result is achieved. Alternatively, calibration can be accomplished with post-processing algorithms performed by computer 46. Similarly, for thick objects that extend beyond the depth-of-focus of the imaging system, digital refocussing can be performed by computer 46. Since the recorded image is complex-valued, refocussing is accomplished by applying a quadratic phase field to each range bin. For many applications, the quadratic phase curvature will be a function of the range of the particular range bin being focussed.

Figure 2:
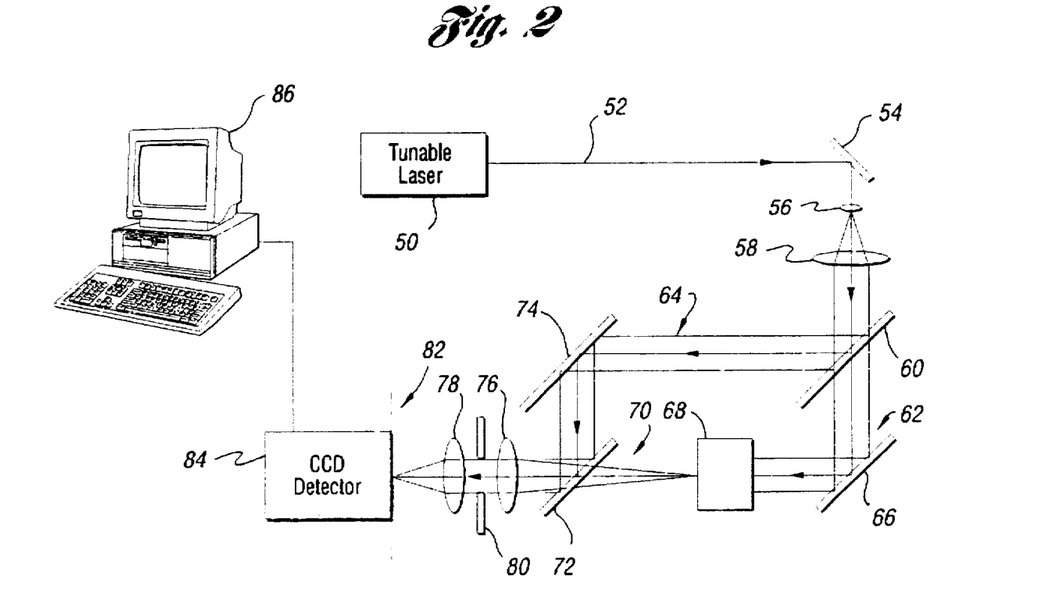
FIG. 2 is a schematic representation of a preferred embodiment of a three-dimensional optical imaging system for transmission imaging according to the present invention.

Referring now to FIG. 2, a schematic representation of a preferred embodiment of a three-dimensional optical imaging system for transmission imaging is shown. As before, tunable laser 50 provides a temporally and spatially coherent energy beam 52. Energy beam 52 is redirected by reflecting mirror 54 and propagates toward beam expander 56 and beam collimator 58 before striking beam splitter 60 which divides the beam into object beam 62 and reference beam 64.

Object beam 62 is redirected by reflective mirror 66 before passing through transmissive object 68. The beam interacts with and is scattered by transmissive object 68 thereby forming scattered energy rays 70 with a portion of the scattered rays 70 impinging upon beam-merging element 72. Reference beam 64 propagates to phase shifting mirror 74 which may impart a relative phase shift between reference beam 64 and object beam 62 as explained below. The phase-shifted beam is redirected to impinge upon beam-merging element 72 where it combines with the scattered rays 70 to form an interference pattern.

Still referring to FIG. 2, a telecentric imaging system formed by lenses 76 and 78 is used in combination with circular aperture 80 for the reasons described above. Here, as before, the interference pattern propagates through transforming lens 78 which performs a two-dimensional Fourier transform on the interference pattern while focusing the pattern at image plane 82. Detector array 84 is positioned adjacent image plane 82 for detecting and transducing the focused interference pattern. Computer 86 communicates with is detector array 84 for recording and processing signals representative of the focused interference pattern so as to form a three-dimensional image as described above.

Figure 3:
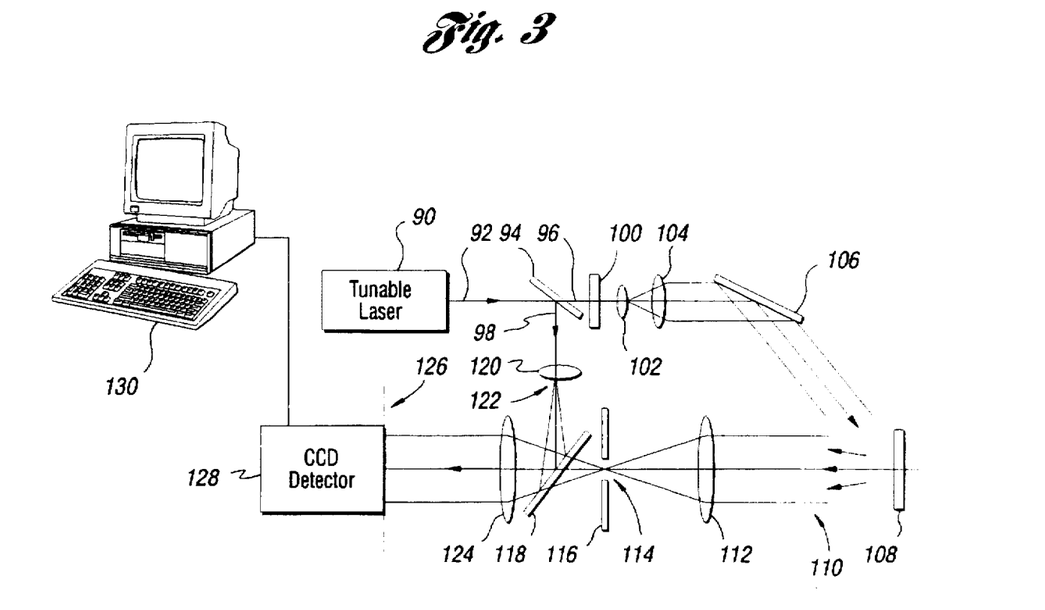
FIG. 3 is an alternative embodiment of a three-dimensional optical imaging system for reflection imaging according to the present invention.

Referring now to FIG. 3, an alternative embodiment of a three-dimensional optical imaging system for reflection imaging is shown. In this embodiment, tunable laser 90 provides an optical energy beam 92 which is spatially and temporally coherent. Energy beam 92 propagates to a partially-reflective beam splitter 94 where it is divided into an object beam 96 and a reference beam 98.

Object beam 96 propagates through a phase modulator 100 which may shift the phase of object beam 96 relative to reference beam 98, as previously explained. As before, the phase shifter may be any of a number of known devices, such as an electro-optic, acousto-optic, or piezoelectric device. The phase-shifted reference beam propagates through a diverging lens 102 which radially expands the beam and then through a collimating lens 104. The beam emerges from collimating lens 104 having a substantially planar wavefront. The collimated beam strikes mirror 106 and is reflected so as to impinge upon object 108.

With continuing reference to FIG. 3, the incident energy beam impinges upon and interacts with object 108 which scatters the energy thereby forming scattered energy rays, indicated generally by reference numeral 110. A portion of the scattered energy rays propagate toward collecting lens 112 which focuses the rays to form an object point source 114. A circular aperture 116 is positioned in the focal plane of collecting lens 112 to expand the spatial bandwidth of the system while imposing an aperture function on the transmitted light, as previously described. Preferably, object point source 114 is positioned at the center of aperture 116. After converging at object point source 114, the rays diverge and strike a unidirectionally transmissive beam-merging element 118 where they combine with reference beam 98. The beam-merging element 118 transmits substantially all incident light propagating in one direction while reflecting substantially all incident light propagating in the opposite direction, as is well known in the art.

As also shown in FIG. 3, reference beam 98 propagates through converging lens 120 which focuses the beam to a reference point source 122. The reference beam 98 then diverges before striking beam-merging element 118 which reflects preferably all of the incident reference beam energy in a direction coincident with the diverging rays emanating from object point source 114. The reference and object energy beams combine at beam-merging element 118 to form an interference pattern. Preferably, beam-merging element 118 is positioned so that reference beam 98 and rays emanating from object point source 114 illuminate an equal area on beam-merging element 118.

Still referring to FIG. 3, the interference pattern propagates through transforming lens 124 which performs a two-dimensional Fourier transform while focusing the interference pattern at image plane 126. Thus, a discernible image in the likeness of object 108 is formed in image plane 126. A two-dimensional detector array 128 is positioned adjacent image plane 126 for detecting the discernible image. The detector array may be any of a variety of detectors known in the art, such as a charge-coupled-device (CCD) array. Detector array 128 is connected to a computer 130 for storing and processing data representative of the focused interference pattern. Generally, the detector array responds to the intensity of the incident energy and produces electrical signals which are easily processed by computer 130.

Figure 4:
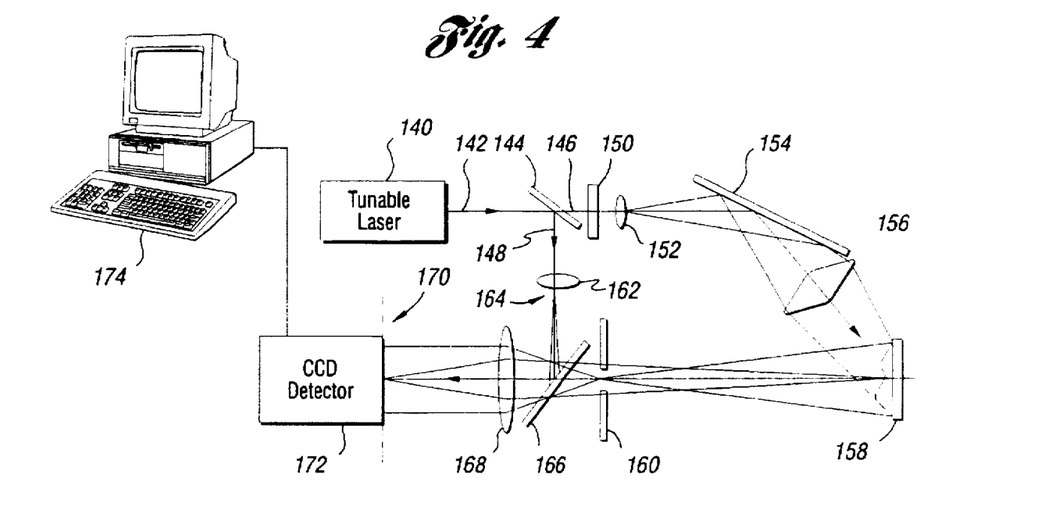
FIG. 4 is an alternative embodiment of a three-dimensional optical imaging system for reflection imaging utilizing fewer optical elements according to the present invention.

Referring now to FIG. 4, an alternative embodiment of a three-dimensional optical imaging system for reflection imaging according to the present invention is shown. Similar to the system of FIG. 1, tunable laser 140 provides a temporally and spatially coherent energy beam 142. Beam splitter 144 divides the energy beam into an object beam 146 and a reference beam 148. The object beam 146 propagates through phase shifter 150 and diverging lens 152 before striking mirror 154 which redirects object beam 146 toward object lens 156.

As also illustrated in FIG. 4, after passing through object lens 156, object beam 142 impinges upon and interacts with object 158 which scatters object beam 142. Object 158 reflects a portion of the incident energy toward aperture 160. Energy passing through aperture 160 propagates through beam-merging element 162. Reference beam 148 propagates through converging lens 162 forming reference point source 164. Reference beam 148 then expands radially and impinges upon beam-merging member 166 where it combines with energy passing through aperture 160 to form an interference pattern. The interference pattern propagates through transforming lens 168 which performs a two-dimensional Fourier transform while focusing the interference pattern at image plane 170. Detector array 172 is located adjacent image plane 170 for detecting and transducing the focused interference pattern. Detector array 172 is connected to computer 174 for recording and processing as previously described.

Figure 5:
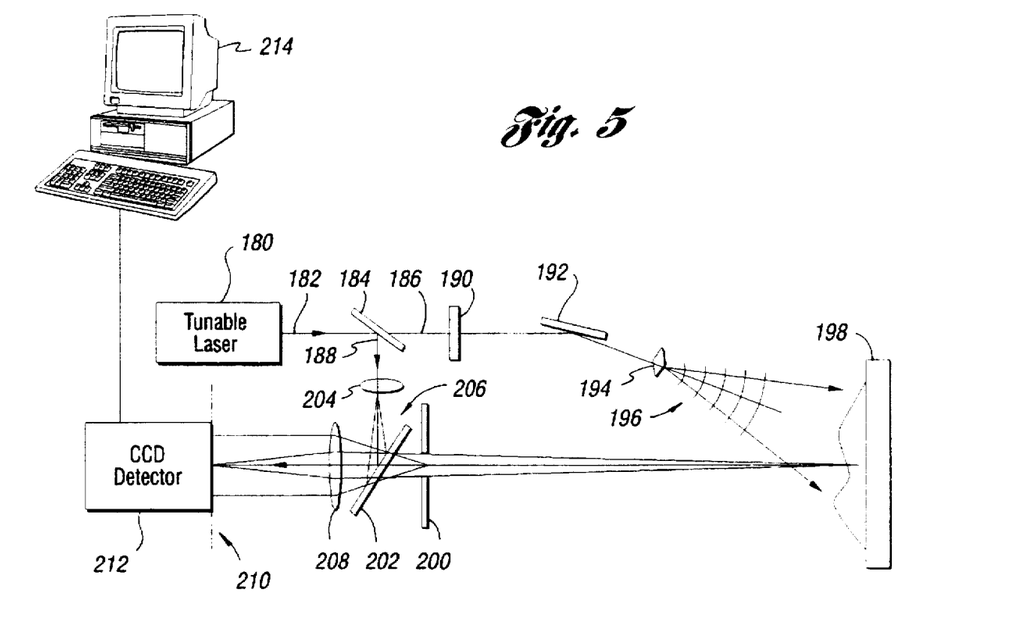
FIG. 5 is another alternative embodiment of a three-dimensional optical imaging system particularly useful for imaging large objects according to the present invention.

Referring now to FIG. 5, another alternative embodiment of a three-dimensional optical imaging system particularly useful for imaging large objects is shown. As in the previous embodiments, tunable laser 180 produces a temporally and spatially coherent energy beam 182 which impinges upon beam splitter 184 thereby dividing it into object beam 186 and reference beam 188. Object beam 186 passes through phase shifter 190 before being redirected by mirror 192. As previously explained, phase shifter 190 may change the phase of object beam 186 relative to reference beam 188 for conventional in-phase and quadrature detection.

Still referring to FIG. 5, object beam 186 propagates through diverging lens 194 which disperses the beam changing the substantially planar wavefronts to substantially spherical wavefronts, indicated generally by reference numeral 196. The spherical wavefronts 196 fully illuminate large object 198 which interacts with and scatters the incident energy. A portion of the scattered energy propagates through aperture 200 before striking beam-merging element 202. Reference beam 188 propagates through converging lens 204 and is focused to reference point source 206 from which point it diverges and strikes beam-merging element 202. The reference beam 188 then combines with reflected energy from large object 198 to form an interference pattern.

As also illustrated in FIG. 5, transforming lens 208 performs a two-dimensional Fourier transform while focusing the interference pattern at image plane 210. Detector array 212 is positioned adjacent image plane 210 for detecting and transducing the focused interference pattern as before. Computer 214 is connected to detector array 212 for recording and processing the holographic information to produce a three-dimensional image. In this embodiment, the detected image present at image plane 210 requires processing with a standard digital remapping algorithm due to the spherical wavefronts 196 produced by diverging lens 194. Digital remapping is performed by computer 214 while generating the three-dimensional image.

Figure 6:
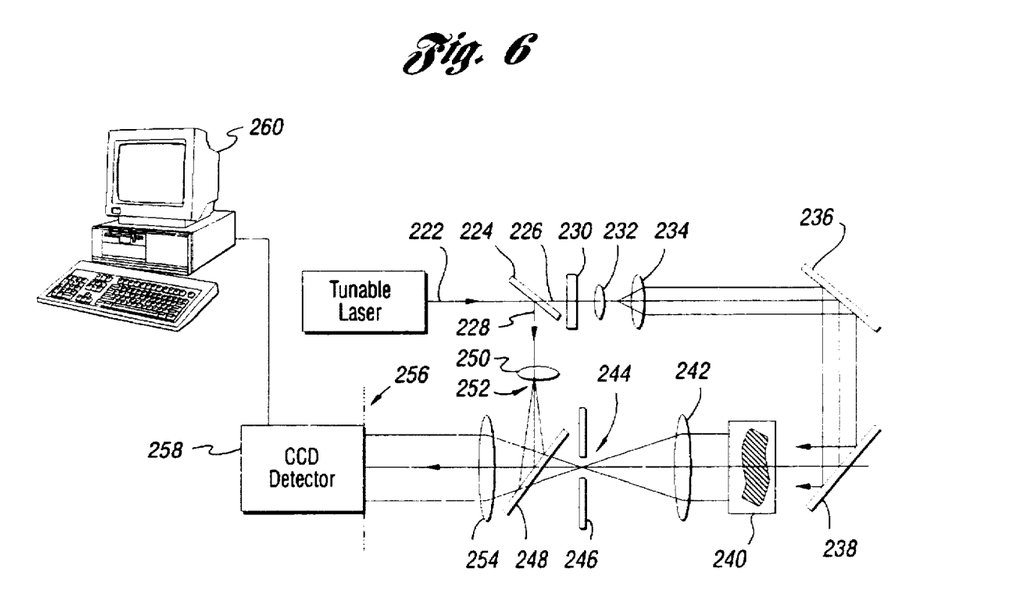
FIG. 6 is an alternative embodiment of a three-dimensional optical imaging system particularly useful for imaging through transmissive media according to the present invention.

Referring now to FIG. 6, another alternative embodiment of the present invention particularly useful for imaging through transmissive media is shown. As before, tunable laser 220 provides a temporally and spatially coherent energy beam 222. Energy beam 222 propagates toward beam splitter 224 which divides the beam into object beam 226 and reference beam 228. Object beam 226 passes through phase shifter 230 and then through expanding lens 232 which radially expands the beam. The expanded beam passes through collimating lens 234 so that the emerging rays are substantially parallel with planar wavefronts.

Still referring to FIG. 6, the collimated beam is redirected by mirrors 236 and 238 so that it passes through transmissive object 240. The beam interacts with and is scattered by transmissive object 240 with a portion of the energy impinging upon collecting lens 242. Collecting lens 242 focuses the transmitted energy to form object point source 244. Preferably, object point source 244 is positioned at the center of circular aperture 246. The transmitted beam passing through aperture 246 strikes beam-merging element 248. Reference beam 228 passes through converging lens 250 to form reference point source 252, thereafter expanding and also striking beam-merging element 248. The expanding reference beam combines with the reflected object beam to form an interference pattern. Transforming lens 254 performs a two-dimensional Fourier transform on the interference pattern while focusing the pattern at image plane 256. Detector array 258 is positioned adjacent image plane 256 for detecting and transducing the focused interference pattern. Computer 260 communicates with detector array 258 for recording and processing signals representative of the focused interference pattern so as to form a three-dimensional image as previously described.

Figure 7:
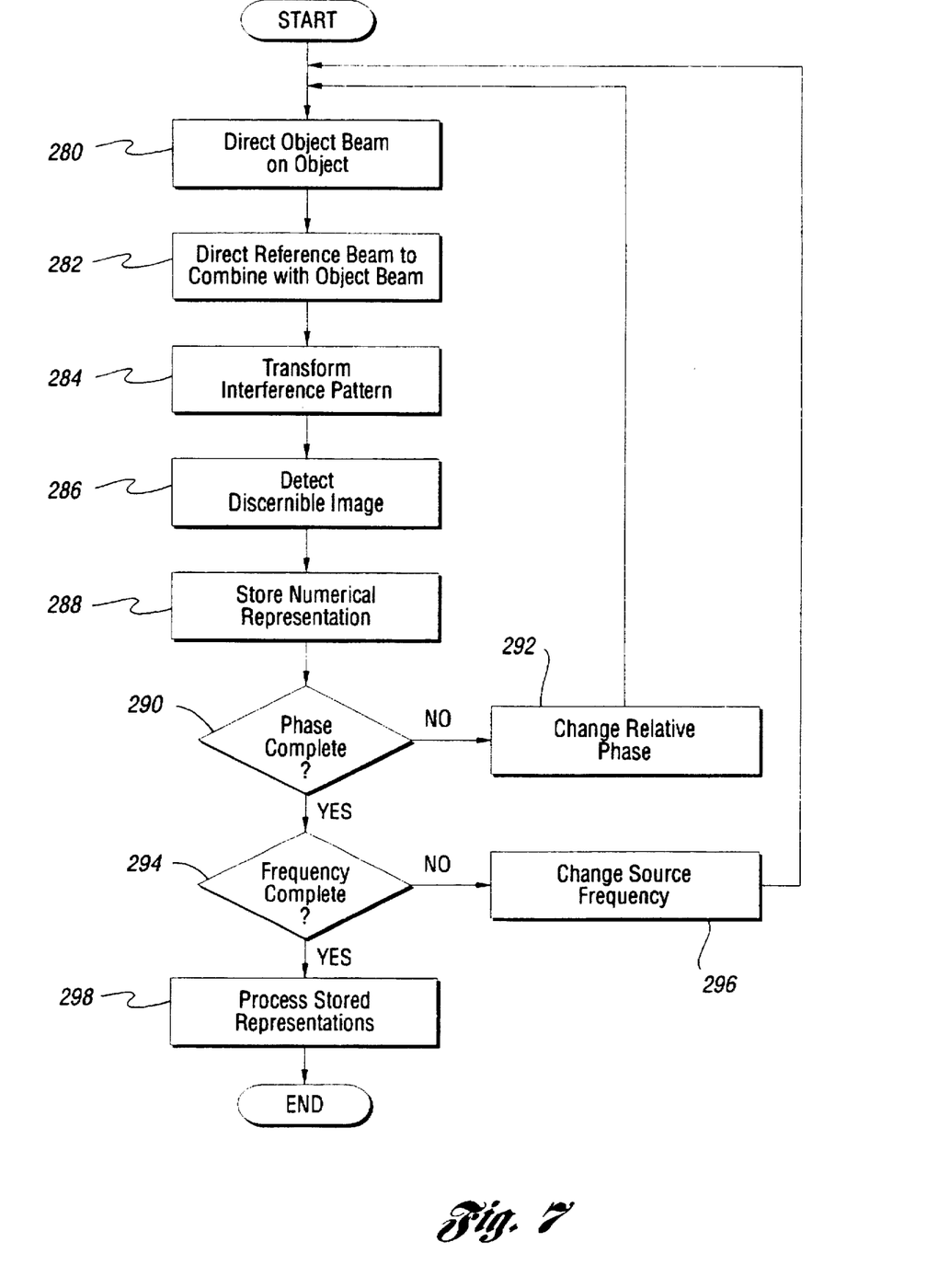
FIG. 7 is a flow chart illustrating a method for forming a three-dimensional image of an object according to the present invention.

Referring now to FIG. 7, a flow chart illustrating a method for forming a three-dimensional image of an object according to the present invention is shown. Step 280 comprises directing a temporally and spatially coherent object energy beam to impinge upon and interact with an object to be imaged. The object will scatter the energy beam thereby forming scattered energy rays. Step 282 includes directing a temporally and spatially coherent reference beam to combine with the scattered rays produced in step 280 thereby forming an interference pattern. A two-dimensional Fourier transform of the interference pattern is produced at step 284 by interposing a lens in the path of propagation of the evolving interference pattern. The lens focuses the pattern to produce a discernible image in the likeness of the object.

Still referring to FIG. 7, step 286 includes detecting the focused interference pattern which is recognizable as a likeness of the object, preferably with a two-dimensional detector array. Once detected, a numerical representation of the image is stored at 288 for processing by a computer. Step 290 represents a test to determine if all the phase increments have been completed. The number of incremental phase changes is predetermined by the system operator but is preferably four phases with an increment of π/2 for conventional in-phase and quadrature detection. If an interference pattern has not been recorded for each of the predetermined phases, the relative phase between the object and reference beams is changed at step 292 and the process is repeated beginning with step 280.

After images are recorded for each of the predetermined phases, the method continues in a similar fashion at step 294 by determining if a pattern has been recorded for all of the predetermined frequencies. As previously explained, the number of frequencies utilized depends on the particular object being imaged. Some objects may require as few as three distinct source frequencies while others may require up to sixty-four source frequencies. If an interference pattern has not been recorded for all of the predetermined frequencies, the source frequency is changed at step 296 and the method is repeated beginning with step 280. After completing recording at all of the predetermined source frequencies, the stored numerical representations are processed by a computer at step 298. The processing includes computing a one-dimensional Fourier transform of the complex values detected by the two-dimensional detector array thereby generating a three-dimensional image in digital form for analysis and viewing.

It is understood, of course, that while the form of the invention herein shown and described constitutes the preferred embodiment of the invention, it is not intended to illustrate all possible forms thereof. It will also be understood that the words used are descriptive rather than limiting, and that various changes may be made without departing from the spirit and scope of the invention disclosed.

What is claimed is:

1. A method of forming an image of an object, the method comprising:
    a) directing an object energy beam substantially coherent in space and in time along a predetermined path, the object energy beam impinging upon and interacting with the object so as to scatter the energy beam to form scattered energy rays;
    b) directing a reference energy beam substantially coherent in space and in time, and substantially coherent with the object energy beam, along a predetermined path, the reference energy beam combining with the scattered energy rays so as to form an interference pattern;
    c) transforming the interference pattern so as to produce a discernible image, the image being recognizable as a likeness of the object;
    d) detecting the discernible image for previewing and positioning the object;
    e) storing a numerical representation of the discernible image for processing by a computer;
    f) repeating steps a) through e) for each of a plurality of relative phase differences, the relative differences being between the phase of the object energy beam and the phase of the reference energy beam so as to determine the complex values representative of the interference pattern;
    g) repeating step f) for each of a plurality of frequencies of the object energy beam and the reference energy beam, the object and reference energy beams having a substantially common frequency for each repetition; and
    h) processing the stored numerical representations to generate an image of the object.

2. The method of claim 1 wherein transforming the interference pattern comprises focussing the interference pattern with a lens to form the discernible image on a two-dimensional detector.

3. The method of claim 1 wherein processing the stored numerical representations comprises performing a numerical transformation on a series of the stored numerical representations so as to produce a plurality of single values, each single value representative of a physical parameter associated with a point on the object.

4. The method of claim 3 wherein performing a numerical transformation comprises performing a one-dimensional Fourier transform.

5. The method of claim 3 wherein performing a numerical transformation comprises performing a Fast-Fourier transform.

6. The method of claim 3 wherein performing a numerical transformation comprises performing a discrete Fourier transform.

7. The method of claim 1 wherein step g) is performed for at least three frequencies of the object and reference energy beams and processing the stored numerical representations comprises solving a plurality of simultaneous equations, each equation corresponding to a frequency difference between two of the at least three frequencies of the object and reference energy beams.

8. The method of claim 1 wherein processing comprises:
    performing a numerical transformation on a series of the stored numerical representations so as to produce a plurality of single values, each single value representative of a physical parameter associated with a point on the object; and
    applying a quadratic phase field to each of the plurality of single values so as to digitally refocus the image of the object.

9. The method of claim 1 further comprising digitally comparing and contrasting the image with a stored data set representative of a second object so as to determine the correlation therebetween.

10. The method of claim 1 wherein the object and reference energy beams comprise electromagnetic waves.

11. The method of claim 10 wherein directing the object energy beam comprises compensating an optical path length of the object energy beam so as to substantially match an optical path length of the reference energy beam.

12. The method of claim 1 wherein the object and reference energy beams comprise acoustical waves.

13. The method of claim 12 wherein directing the object energy beam comprises compensating the length of the predetermined path of the object energy beam so as to substantially match the length of the predetermined path of the reference energy beam.

14. A system for forming an image of an object, the system comprising:
    an energy source for providing an object energy beam and a reference energy beam, the energy beams being substantially coherent with each other and substantially coherent in space and in time;
    means for directing the object energy beam along a predetermined path of propagation so as to impinge upon and interact with the object, the interaction scattering the energy beam to form scattered energy rays;
    means for directing the reference energy beam along a predetermined path so as to combine with the scattered energy rays forming an interference pattern;
    means for transforming the interference pattern so as to produce a discernible image, the image being recognizable as a likeness of the object;
    a detector for detecting the discernible image so as to preview and to position the object;
    a memory for storing a numerical representation of the discernible image for processing;
    means for introducing a plurality of relative phase differences, the relative differences being between the phase of the object energy beam and the phase of the reference energy beam so as to determine at least one complex value representative of the interference pattern;
    means for generating a plurality of frequencies of the object energy beam and the reference energy beam; and
    a computer for processing the stored numerical representations to generate the image of the object.

15. The system of claim 14 wherein the energy source comprises an electromagnetic radiation source.

16. The system of claim 15 wherein the electromagnetic radiation source is a tunable laser.

17. The system of claim 14 wherein the energy source comprises an acoustic wave source.

18. The system of claim 14 wherein the means for directing the object energy beam comprises:

an energy-diverging member positioned in the predetermined path for radially expanding the object energy beam; and an energy-reflecting member disposed between the energy-diverging element and the object for redirecting the expanded object energy beam so as to impinge upon the object.

19. The system of claim 18 wherein means for directing the reference energy beam comprises:

an energy-converging member having a focal length for focusing the reference energy beam so as to provide a substantially point source of energy; and an energy-reflecting member positioned in the path of the reference energy beam between the energy-converging member and the detector, the energy-reflecting member being at a distance from the energy-converging member greater than the focal length of the energy-converging member for redirecting the reference energy beam so as to interfere with the scattered energy rays.

20. The system of claim 14 wherein the means for transforming comprises an energy-converging member for generating a two-dimensional Fourier transform of the interference pattern.

21. The system of claim 14 wherein the detector comprises a two-dimensional array for generating signals representative of the intensity of the discernible image.

22. The system of claim 16 wherein the means for introducing a plurality of phase differences comprises a piezoelectric cell positioned in the path of one of the object and reference energy beams.

23. An optical system for forming an image of an object, the system comprising:

a tunable laser source for providing a temporally and spatially coherent laser beam;

a beam splitter for dividing the laser beam into a reference beam and an object beam each beam having a distinct path of propagation;

a reference-beam lens Positioned in the path of the reference beam for focusing the reference beam to provide a substantially single point source;

a phase modulator interposed in the path of the object beam for changing the phase of the object beam relative to the reference beam;

at least one mirror positioned in the path of the object beam subsequent to the phase modulator for redirecting the object beam so as to impinge upon and to interact with the object to form scattered rays having distinct paths of propagation;

an obstructing member having an aperture, the member positioned in the paths of the scattered rays subsequent to the at least one mirror for obstructing the propagation of a portion of the scattered rays;

a beam combining member positioned in the path of the reference beam subsequent to the reference-beam lens and subsequent to the aperture, the beam combining member operative to redirect the reference beam so as to combine with and to interfere with the rays propagating through the obstructing member to form an interference pattern;

an imaging lens having a finite focal length positioned subsequent to the beam combining member for focusing the interference pattern so as to form a discernible image of the object;

a two-dimensional detector array for detecting the discernible image of the object, the array positioned about at the image plane of the system subsequent to the transforming lens, the detector array being operative to generate signals characterizing the interference pattern; and a computer operably connected to the detector array for processing the signals to perform a one-dimensional Fourier transform to generate the image of the object.

24. The system of claim 23 further comprising a beam expander positioned in the path of the object beam between the phase modulator and the at least one mirror for radially expanding the object beam.

25. The system of claim 24 further comprising:

a collimating lens having a finite focal length, the lens positioned in the path of the object beam between the beam expander and the at least one mirror at a distance from the beam expander approximately equal to the collimating-lens focal length; and an object lens having a finite focal length positioned between the object and the obstructing member at a distance from the obstructing member approximately equal to the object-lens focal length, the object lens being operative to focus the scattered rays so as to form a substantially single point source.

26. The system of claim 27 wherein the object being imaged is translucent and wherein the at least one mirror is positioned so as to cause the object beam to impinge upon and to propagate through the object so as to interact with the object and to form scattered rays.

27. The system of claim 26 further comprising a converging lens positioned between the at least one mirror and the object for radially reducing the object beam and redirecting the object beam so as to impinge upon and to interact with the object to form scattered rays.

* * * * *